Oct. 23, 1951    L. STEBELTON ET AL    2,572,212
APPARATUS FOR GRINDING AUGER BITS AND SIMILAR ARTICLES
Filed April 13, 1950    4 Sheets-Sheet 1
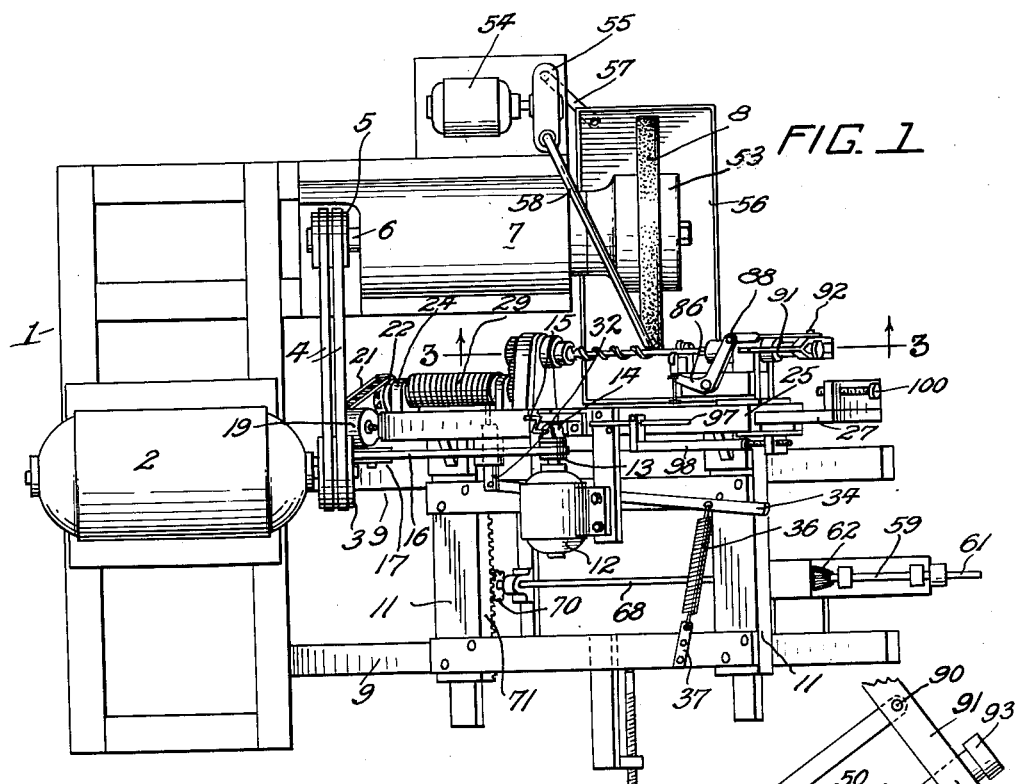
FIG. 1
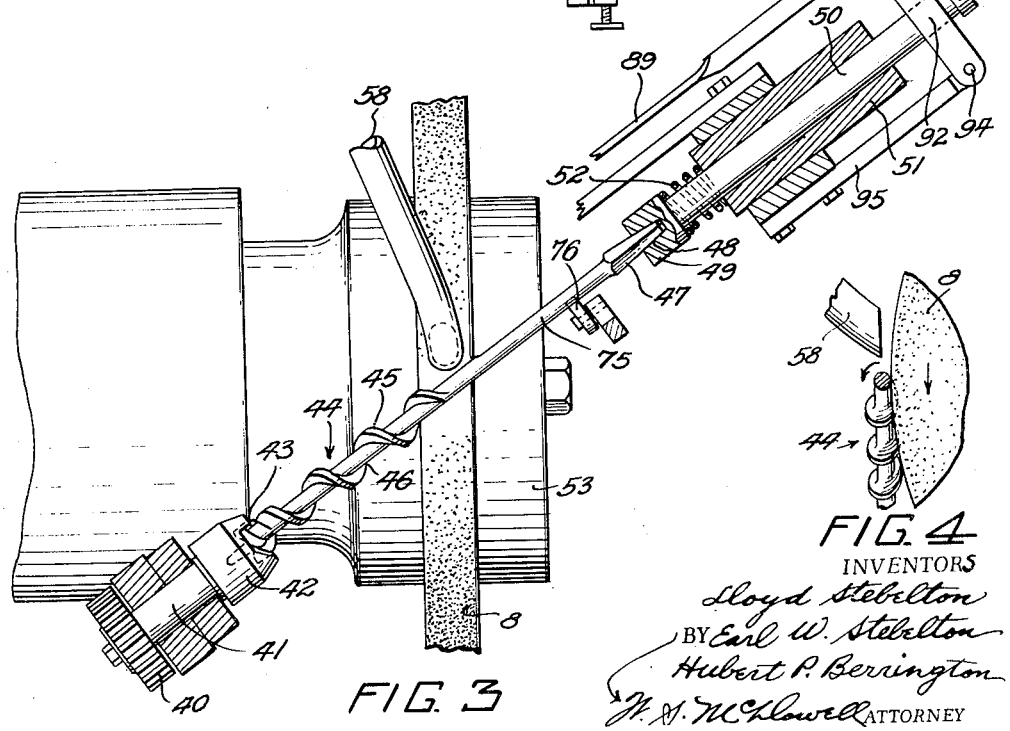
FIG. 3
FIG. 4
INVENTORS
Lloyd Stebelton
Earl W. Stebelton
BY Hubert P. Berrington
W. N. McDowell ATTORNEY Oct. 23, 1951   L. STEBELTON ET AL   2,572,212
APPARATUS FOR GRINDING AUGER BITS AND SIMILAR ARTICLES
Filed April 13, 1950   4 Sheets-Sheet 2
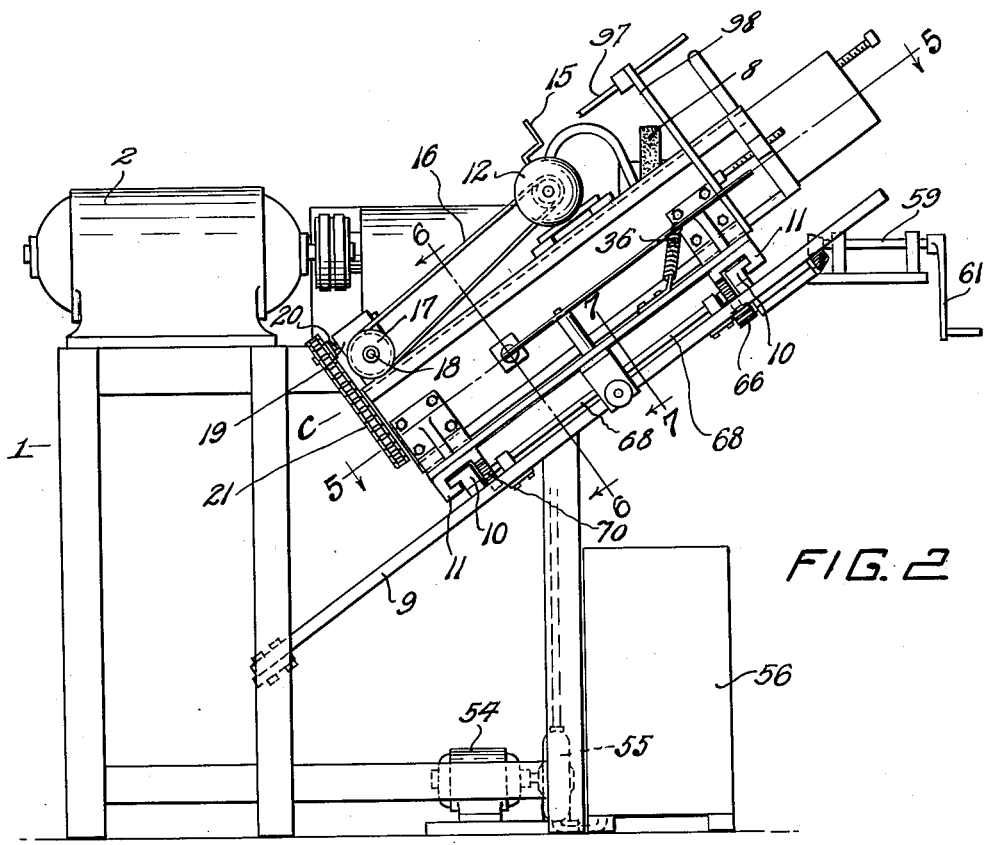
FIG. 2
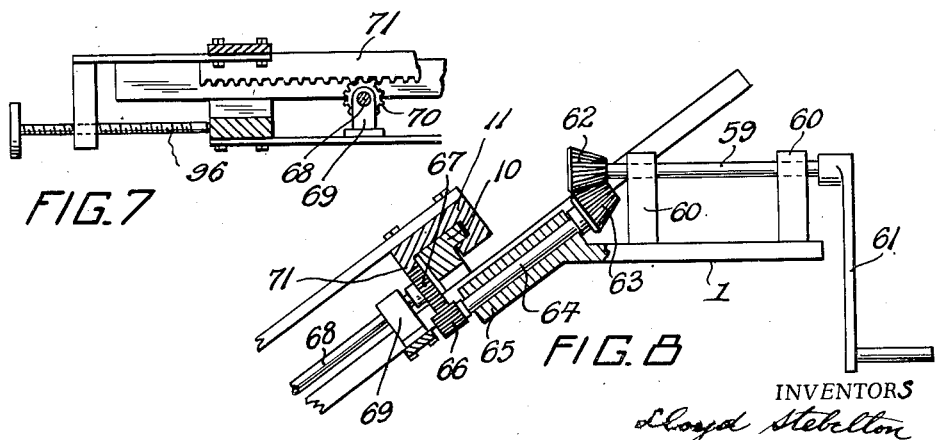
FIG. 7
FIG. 8

Patented Oct. 23, 1951

2,572,212

UNITED STATES PATENT OFFICE 2,572,212

APPARATUS FOR GRINDING AUGER BITS AND SIMILAR ARTICLES

Lloyd Stebelton, Carroll, Earl W. Stebelton, Lancaster, and Hubert P. Berington, Columbus, Ohio Application April 13, 1950, Serial No. 155,702

7 Claims. (Cl. 51—95)

This invention relates to an improved machine for manufacturing auger bits, drills, reamers and other tools or mechanical devices containing helical flutes or grooves.

In the manufacture of cutting and drilling tools of the character set forth, operations employed hitherto have entailed the use of a large amount of hand work, particularly on the better grades of tools, with the result that their manufacturing and selling costs are relatively high.

It is an object of the present invention to provide a machine for automatically, accurately and rapidly grinding finished helical flutes or grooves in the body of an auger, drill or reamer.

It is another object of the invention to provide a machine of this character which performs its intended functions in a precise manner, within close dimensional tolerances and with a high degree of smoothness and finish of the tool surfaces engaged by the grinding member of the machine.

With these and other objects in view, which will appear as the description proceeds, the invention consists in the novel features of construction, combinations of elements and arrangements of parts, hereinafter more fully described in the following specification and illustrated in the accompanying drawings.

In the drawings:

Fig. 1 is a top plan view of the improved auger bit grinding machine comprising the present invention;

Fig. 2 is a side elevational view thereof;

Fig. 3 is a vertical longitudinal sectional view on the plane indicated by the line 3—3 of Fig. 1;

Fig. 4 is a detail view disclosing in elevation the engagement between the grinding wheel of the machine and an angularly disposed auger bit in contact therewith;

Fig. 7 is a similar view on the line 7—7 of Fig. 2;

Fig. 8 is a detail sectional view disclosing the manually operated mechanism for moving the bit-supporting carriage of the machine toward and away from an associated grinding wheel;

Figure 5:
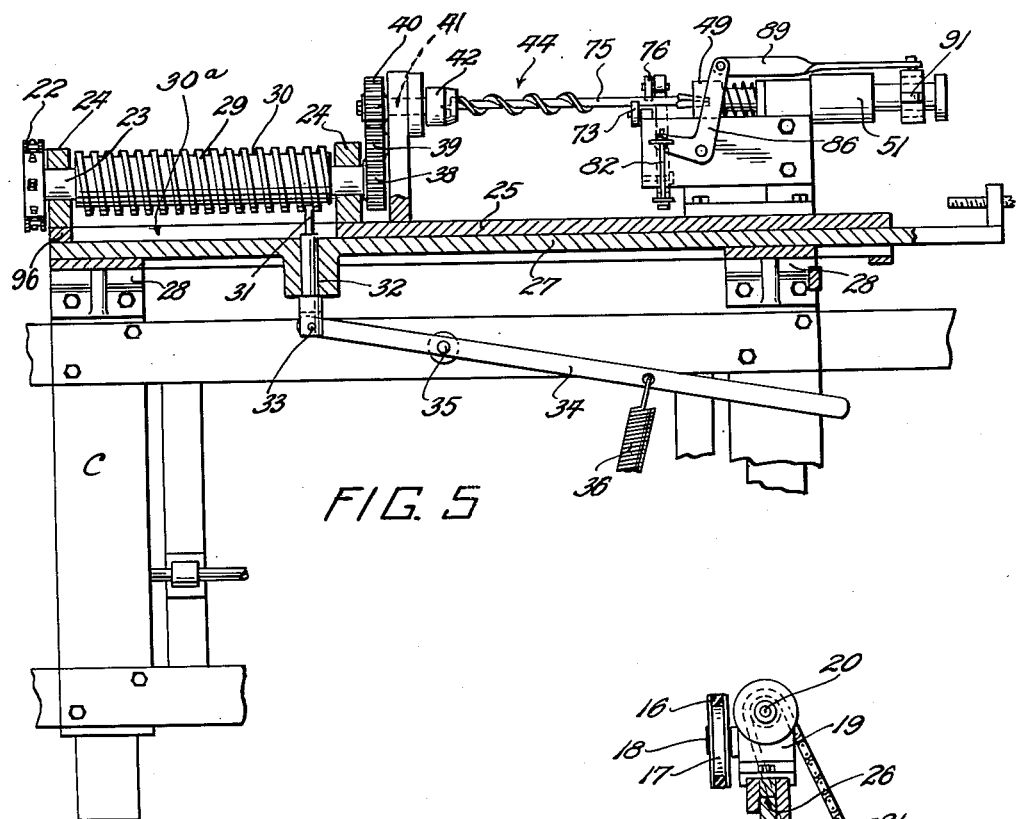
Fig. 5 is a horizontal sectional view on the plane indicated by the line 5—5 of Fig. 2.

In the drawings, the numeral 1 designates the frame of the improved auger bit-grinding machine forming the present invention. The frame when viewed in plan, as in Fig. 1, possesses generally an L-shaped configuration. Supported on the upper part of the frame 1 is an electric motor 2, the armature shaft of which carries a multiple-grooved pulley 3 around which pass a plurality of endless driving belts shown at 4.

These belts are also trained around a multiple-grooved pulley 5 which is mounted upon one end of a shaft 6, the latter being rotatably mounted in an antifriction bearing 7 arranged on the frame 1. The end of the shaft 6 opposite to that carrying the pulley 5 has mounted thereon a grinding wheel or disk 8 which, through the mechanism described, is adapted to be driven at a desired rotational speed by the motor 2.

Forming a part of the main frame 1 are a pair of parallel bars 9 which occupy an inclined plane with respect to the vertical and horizontal, for example, a plane of 36 degrees, more or less. Mounted on and extending transversely across the bars 9 are stationary parallel gib rails 10, the latter being adapted to receive for sliding movement thereon parallel channel members 11 provided on the bottom of a carriage C.

Positioned on the top of a bed plate to be presently described is an electric motor 12. The armature shaft of this motor carries a pulley 13 which by means of a clutch 14 having a control arm 15 may be caused to rotate in unison with said armature shaft. Passing around the pulley 13 is an endless belt 16 which extends to an aligned pulley 17 carried by the shaft 18 of a speed-reducing mechanism which is indicated generally by the numeral 19, said mechanism being mounted on the carriage C, as disclosed particularly in Fig. 2.

Figure 6:
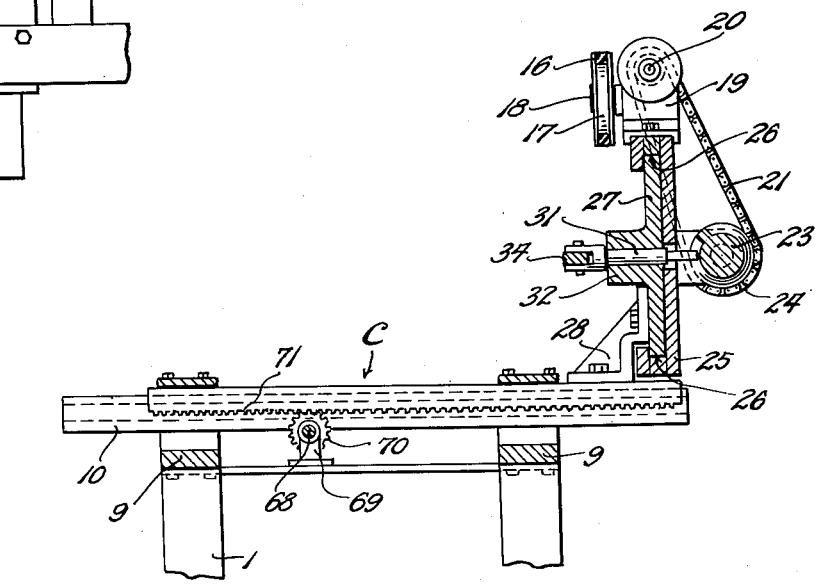
Fig. 6 is a transverse sectional view on the line 6—6 of Fig. 2.

The driven shaft 20 of the mechanism 19 carries a sprocket around which passes an endless chain 21, the latter being trained also over a sprocket shown at 22, the latter being fixed on the lower end of a screw shaft 23. This shaft has the ends thereof journaled as at 24 in bearings carried by a movable bed plate 25. The latter, as shown in Fig. 6, has the upper and lower edges thereof grooved as at 26 to receive the corresponding edges of a stationary plate 27 which is fastened by the brackets 28 to the carriage C.

The shaft 23 includes a drum 29 formed with a helical groove 30. Entering this groove through a slot 30a formed in the plate 25 is one end of a slidable pin 31, the enlarged body of the pin being slidably mounted in a bearing 32 formed in connection with the plate 27. The inner end of the pin is headed and has pivotally secured thereto as at 33 one end of a control lever 34, the latter being pivotally mounted intermediately of its length as at 35 on the frame of the carriage C. A coil spring, shown at 36, has one end secured to the lever 34 and its opposite end attached to a stationary strap 37 mounted on said carriage. The normal tendency of the spring 36 is to so rock the lever 34 as to maintain the pin 31 in the groove 30 of the drum 29, so that when said drum is rotated, through power derived from the motor 12, the movable plate will be caused to slide on the guides provided therefor by the upper and lower edges of the stationary plate 27.

Mounted on the end of the shaft 23 opposite to that carrying the sprocket 22 is a spur gear 38, which meshes with an idler pinion 39, the teeth of the latter meshing, in turn, with those of a spur gear 40. This gear is carried by one end of a shaft 41 which at its end opposite to the gear 40 carries, as shown in Fig. 3, a head 42, the latter being socketed as at 43 to receive and rotate the wood-penetrating lip end 43 of an auger bit 44, the latter being removably mounted in connection with said head, with the lip of the auger so held by the head as to cause the auger to rotate in unison with the shaft 41.

Figure 12:
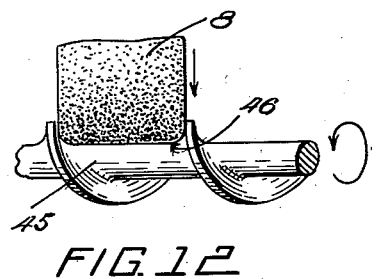
Fig. 12 is an enlarged plan view disclosing the engagement provided by the present machine between the grooved surfaces of an auger bit and the peripheral portion of an associated grinding wheel.

The work piece operated upon by the machine may, as stated, comprise a wood-boring auger bit, the same including a body 45 having a helical groove or flute 46 formed therein. The end of the bit opposite to that containing the lip 43 is provided with a socket-entering tang 47 which, in this instance, is adapted to be received in a socket 48 provided in the headed end 49 of a plunger 50. The latter is slidably mounted in a carriage mounted bearing 51, and a coil spring 52 is arranged between the head 49 and the bearing 51 to clamp the upper end of the bit and to hold the latter in association with the driving and rotating head 42 and through outward movement of the plunger 50 to permit the bit to be readily removed from its operating position in the machine and another bit substituted therefor. It will be observed, particularly by reference to Figs. 3 and 4, that the auger when operatively positioned in the machine is disposed immediately adjacent to the peripheral edge of the grinding wheel 8, the edge of the wheel entering the grooved or fluted body of the bit, as shown in Fig. 12, to grind the bit body to form a groove or flute of precise dimensions and smoothly finished exterior surfaces.

By reference to Fig. 3, it will be noted that the bit is supported in required angular relation to the plane of operation of the grinding wheel or disk to form the helical groove or flute 46 in the body of the bit. The wheel or disk 8 is removably positioned on the shaft 6 by means of the detachable disk 53 carried by the outer end of the shaft 6. This permits of convenient substitution on the part of said grinding wheel or disk and enables the latter to possess various degrees of coarseness or fineness, depending upon the nature of the work to be performed.

During the grinding operation, the frame 1 at the bottom thereof is provided with an electric motor 54, which drives a pump 55. This pump draws a fluid coolant from a tank 56 by way of the inlet pipe 57, and discharges the coolant under pressure through an outlet pipe 58, the upper end of the latter terminating immediately contiguous to the region of engagement of the grinding wheel or disk with the auger body, whereby to maintain the latter at a proper temperature during the grinding operation.

To move the carriage C bodily so that an auger bit supported thereby may be advanced into and out of engagement with the grinding disk, the frame, in this instance, is provided with a shaft 59 which is supported for rotation in bearings 60, as shown in Fig. 8, mounted on the carriage C, the shaft being rotated by a crank handle or other convenient means 61. The inner end of the shaft 59 is equipped with a beveled pinion 62, the teeth of the latter meshing with those of a corresponding pinion 63 which is carried by the upper end of a shaft 64, the latter being journaled as at 65 in the frame 1. The end of the shaft 64 opposite to that carrying the pinion 63 is equipped with a spur tooth pinion 66 which meshes with a straight toothed gear 67 fixed on the upper end of a shaft 68, the latter being rotatably supported as at 69 in connection with the frame 1.

The lower end of the shaft 68 carries a gear 70, the teeth of which, as do those of the gear 67, mesh with a rack bar 71 extending transversely of the carriage C. By rotating the crank handle 61, the carriage C through this mechanism may be readily shifted longitudinally of its length and transversely on the upwardly extending frame bars 9 to present an auger bit to or remove the same from engagement with the grinding disk 8.

Figure 9:
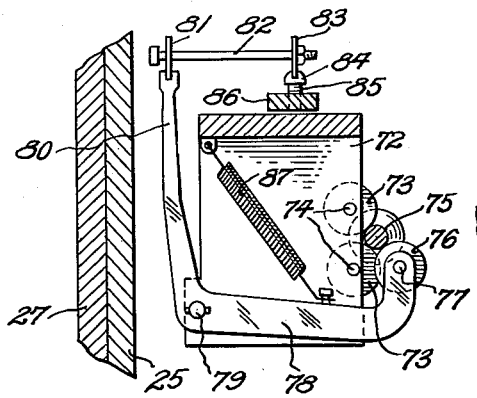
Fig. 9 is a transverse sectional view of the steady rest mechanism employed in the support of an auger bit positioned in the machine.
Figure 10:
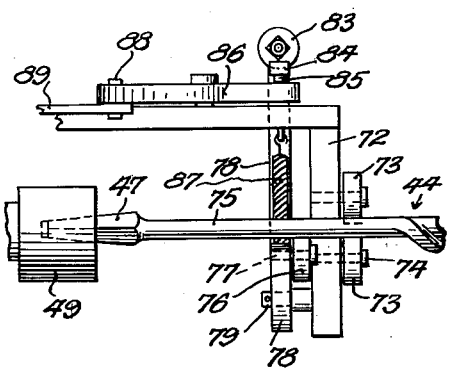
Fig. 10 is a fragmentary front elevational view of the mechanism disclosed in Fig. 9.

To support the shank of the auger bit or other similar work piece while it is being ground by the disk 8, use is made of a steady-rest mechanism shown more particularly in Figs. 9 and 10. This mechanism comprises a stationary angle bracket 72 secured to the plate 25. One leg of this bracket is provided with a pair of rolls shown at 73, which are rotatable about fixed axes 74 carried by the brackets 72, the rolls being spaced sufficiently so that the shank 75 of the auger bit 44 may be positioned against the peripheral edges of said rolls without passing between the latter, thus resisting flexure of the bit shank in one direction.

To resist flexure of the bit shank in the opposite direction and to positively hold said shank against the peripheral edges of the roll 73, use is made of a roller 76 which is rotatably supported as at 77 on one end of a bell crank lever 78, the latter being pivoted as at 79 on the bracket 72. To rock the bell crank lever, the upper end of the arm 80 thereof is bifurcated to receive a disk 81 fixed on one end of a rod 82. The opposite end of the rod carries a disk 83 which is received in a slot provided in the head 84 of a pin 85 provided on one end of another bell crank lever 86. A coil spring 87 joins the lower arm of the bell crank lever 78 with the bracket 72, maintaining the roller 76 in contact with the shank of the auger bit. The end of the lever 86 opposite to that carrying the pin 85 is pivotally connected as at 88 with the inner end of a link 89, the forward end of the latter being pivotally connected as at 90 with a manually operated lever 91, the latter having a yoke-shaped body 92 which cooperates with the headed end 93 of the plunger 50. The lower end of the lever 91 is pivoted as at 94 on an arm 95 projecting stationarily from that portion of the carriage C in which the plunger is slidably mounted.

In removing a bit from the machine, the upper end of the lever 91 is rocked against the resistance offered by the spring 87 so that the bell crank lever 78 may be swung about its pivotal axis 79 to a position in which the roller 76 will be removed from association with the shank 75 of the auger bit. Continued oscillation of the lever moves the plunger 50 to a position in which the headed end 49 of the plunger 50 is withdrawn from engagement with the bit tang 47, thus allowing the lip or boring end 43 of the bit to be lifted out of the receiving and rotating socket provided by the chuck or head member 42. With the parts of the machine held as thus described, a new work piece or bit may be inserted into the machine, the lip end thereof being first positioned in the driving socket of the chuck head 42 and the tang end of the bit then being centered in the socket 48 of the headed end 49 of the plunger 50. The lever 91 may then be released, causing the spring 87 to bring the lever-carried roller 76 into supporting engagement with the bit shank 75, and also enabling the spring 52 to move the plunger 50 to retain the bit tang 47 in the socket 48.

When a ground auger bit is removed from the work-holding or chuck mechanism of the machine, the carriage C is caused to assume a position at the left of the machine with the auger bit spaced from the grinding wheel. This may be done by rotating the crank handle 61 and the gearing shown at 67, 70 and 71. Upon the insertion of an unground auger, which constitutes ordinarily a rough and unfinished helically grooved forging, into the machine, with the auger bit spaced from the grinding wheel, as indicated, the pin 31 is removed from engagement with the helical groove 30 of the screw drum by rocking the lever 34 against the resistance of the spring 36. Due to the angularity of the carriage C and the movable plate 25 carried thereby, the removal of the pin 31 from contact with the groove of the screw drum causes the plate 25 and the chucking mechanism supported thereon to gravitate bodily in a downward direction a distance equivalent roughly to the length of the drum 29, such downward movement being limited by the stop indicated at 96. The lever 34 is then released so that the pin 31 may be restored to its position in the helical groove 30 of the screw drum. The carriage C is then shifted bodily by the rotation of the crank handle 61 until the convolute body of the work piece is brought into contact with the peripheral edge of the grinding wheel 8, coolant from the pipe 58 being positively applied thereto through the operation of the motor-driven pump 55. The operation of the motor 12 is then started through the actuation of the clutch-controlling lever 14, causing the rotation of the drum 29 in a direction to cause the elevation of the plate 25 in its inclined guide, such elevation being effected through the coaction between the relatively stationary pin 31 and the helical groove of the drum 29.

As the drum rotates, the work piece is incrementally rotated through the gearing indicated at 38, 39 and 40, which revolves the chuck head 42 and revolves the work piece about its longitudinal axis while it is being maintained in contact with the rotating peripheral edge of the grinding disk 8. Due to the shape of the peripheral portion of the grinding wheel or disk 8 and the angular position of the work piece or auger bit 4 in relation thereto, the fluting in the auger bit will be perfectly produced and smoothly ground to required dimensional accuracy while the plate 25 is moving upwardly on the inclined stationary plate 27.

Figure 11:
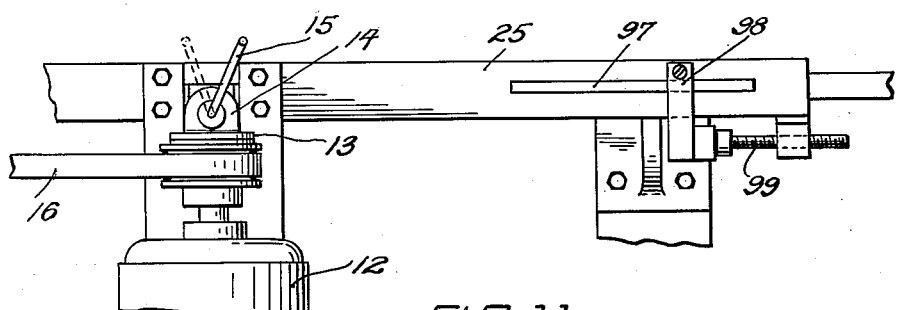
Fig. 11 is a detail plan view of the clutch-controlled drive means for rotating an auger bit blank or other work piece positioned in the machine.

As shown in Fig. 11, when the upward movement of the plate 25 has about reached its limit, the clutch lever 15 will engage with an adjustable stop rod 97, the latter carrying a bracket 98 which is adapted to engage one end of an adjustable screw 99 so that the clutch 13 of the driving motor 12 will be disengaged to interrupt the transmission of power from the motor 12 to the screw drum 29 and the auger bit. Another adjustable stop screw 100 may be mounted on the upper end of a stationary plate 27 to positively arrest upward movement of the movable plate 25. When such upward movement has been reached, the crank handle 61 is actuated to withdraw the auger bit from engagement with the grinding wheel by sliding the carriage C to the left of the frame 1, as viewed from the operator's position.

The grinding cycle thus described may be repeated, if necessary, or a new work piece may be introduced into the machine.

It will be understood that grinding wheels of different abrasive characteristics may be used, for example, to produce coarse or fine grinding actions.

The machine forming the present invention is thus simple to construct and virtually automatic in operation with the exception of the placement and removal of auger bits into and from the machine. Auger bits of improved quality are quickly produced in a time and labor-saving manner.

We claim:

1. In apparatus for grinding helical grooves in tool bodies, a frame, a grinding wheel supported on said frame for rotation in a substantially vertical plane, an operating motor mounted in said frame for rotating said wheel, frame-carried inclined supports, parallel longitudinally extending cross guides on said supports, a work-receiving carriage mounted on said supports and movable longitudinally of said guides toward and away from said grinding wheel, manually operated means for moving said carriage, a bed plate slidably mounted on said carriage, a helically grooved cylinder supported for rotation on one side of said bed plate, motor-driven means carried by said plate for rotating said cylinder, manually operated coupling means movably mounted on said carriage, said coupling means being engageable with the helical groove of said cylinder to effect upward movement of said bed plate relative to said carriage and in the inclined plane of the latter, and rotatable work-receiving means carried by said bed plate, said last-named means being rotatable synchronously with said cylinder through the operation of said plate-carried motor-driven means, said work-receiving means being engageable with said wheel when said carriage is advanced toward the latter.

2. In apparatus for grinding helical grooves in tool bodies, a frame, a power-driven grinding wheel rotatably supported on said frame, said wheel rotating in a substantially vertical plane, an inclined stationary support carried by said frame, said support including transversely extending guides, a carriage movable longitudinally on the guides of said support toward and away from said wheel, a tool-mounting bed slidably mounted on one end of said carriage and arranged adjacent to said wheel, means carried by said bed and detachably engageable with the opposite ends of a tool to be presented to said grinding wheel for supporting and rotating said tool, motor driven means carried by said bed for effecting rotation of a tool held by said supporting and rotating means, and means operable synchronously with the application of power to said tool-supporting and rotating means for moving said bed relative to said carriage, whereby to cause a supported and rotating tool body arranged on the bed to move while rotating longitudinally and angularly in engagement with the peripheral edge of said grinding wheel.

3. Apparatus for grinding helically grooved tool bodies as defined in claim 2, and wherein said bed is provided with a steady rest mechanism for supporting intermediate portions of a tool body removably and rotatably mounted in connection with said plate.

4. In apparatus for grinding helical grooves in tool bodies, such as augers, reamers, drills and the like, a frame, an inclined support carried by said frame, said support being formed with parallel longitudinally extending cross guides, a carriage disposed on said support for movement longitudinally of said guides, said carriage being positioned in a plane angular to the horizontal and vertical, a tool-mounting bed slidably positioned on one side of said carriage, means for moving said bed relative to said carriage in the inclined plane of the latter, said means embodying a helically grooved cylindric member supported for rotation on said bed, motor driven means carried by said bed for rotating said member, manually operated coupling means movably mounted on said carriage and engageable with the helical groove of said cylindric member to produce bodily upward movement of said bed relative to said carriage, and a work-clamping and rotating means carried by said bed for presenting a tool body to an associated grinding instrumentality.

5. Apparatus for grinding helical grooves in tool bodies and the like as defined in claim 4, and wherein said motor-driven means includes a clutch having an operating member, and an adjustable stop device carried by said frame in a position to cooperate with the operating member of said clutch to arrest automatically the transmission of power to said cylindric member when said bed reaches approximately the ends of its upward movement in the inclined plane of said carriage.

6. Tool-grinding apparatus comprising a frame provided with parallel ways, a carriage positioned on said frame for movement longitudinally of said ways, said carriage including a relatively stationary plate member which forms a component part thereof, a bed plate supported for guided slidable movement on the plate member of said carriage, a helicallly grooved drum mounted for rotation about its longitudinal axis at one side of said bed plate, motor driven means carried by said bed plate for imparting rotation to said drum, a slidable coupling pin carried by the plate member of said carriage, said pin having one end thereof positioned in the helical groove of said drum, a manually operated lever for moving said pin into and out of engagement with the helical groove of said drum, spring means coacting with said lever and pin for normally maintaining one end of the pin in engagement with the groove of said drum, tool-chucking means carried by said bed plate for detachably clamping the ends of a tool body in rotatably supported relation with said bed plate, and means driven by said drum for rotating said tool-chucking means.

7. In apparatus for grinding helically grooved or fluted tool bodies, such as augers, reamers, drills and the like, a frame, a power-driven grinding wheel rotatably supported on said frame with the wheel rotating in a substantially vertical plane, a carriage slidably mounted on said frame for movement toward and away from said grinding wheel, frame-carried supporting means for said carriage disposed to maintain the latter in an operating plane angular to both the horizontal and vertical, a tool-supporting bed slidably mounted on said carriage adjacent to said grinding wheel, said bed being movable in the inclined plane of said carriage, a rotatable work-receiving chuck carried by said bed for the reception of one end of a tool body to be ground, clamping means carried by said bed in longitudinal alignment with and spaced from said chuck for the removable reception of the tang end of the tool body engaged by said chuck, said clamping means being provided with a bearing, a plunger mounted in said bearing, said plunger at one end being formed with a socket for the reception of the tang end of the tool body, a spring pressing on said plunger, manually operated means for moving said plunger in said bearing against forces of said spring, a steady-rest mechanism carried by said bed for engagement with an intermediate portion of a tool body confined between said chuck and said plunger, said mechanism including a movable roller, spring means normally maintaining said roller in a position of tool support, means actuated cooperatively with said plunger for removing said roller from its normal position of tool support when said plunger is moved to a position releasing the tang end of an associated tool, motor-driven means for rotating said chuck and a tool body engaged therewith, and means operating synchronously with the rotation of said chuck for moving said bed and the means carried thereby bodily in an upward direction and in the inclined plane of said carriage, whereby to present the helical groove in the tool body throughout its length to the rotating peripheral edge of said grinding wheel.

LLOYD STEBELTON.
EARL W. STEBELTON.
HUBERT P. BERINGTON.

REFERENCES CITED

The following references are of record in the file of this patent:

UNITED STATES PATENTS

| Number | Name | Date |
|---|---|---|
| 986,688 | Catucci | Mar. 14, 1911 |
| 1,275,218 | Calkins | Aug. 13, 1918 |
| 1,659,227 | Wildhaber | Feb. 14, 1928 |
| 1,867,213 | Douglas | July 12, 1932 |
| 2,510,830 | Nixon | June 6, 1950 |

FOREIGN PATENTS

| Number | Country | Date |
|---|---|---|
| 560,704 | Great Britain | Apr. 17, 1944 |